United States Patent [19]

Williams

[11] Patent Number: 5,029,693
[45] Date of Patent: Jul. 9, 1991

[54] SWING-UP SWIVEL WHEEL DIVERTER ASSEMBLY AND METHOD

[75] Inventor: Richard A. Williams, Danville, Ky.
[73] Assignee: Babcock Industries, Inc., Fairfield, Conn.
[21] Appl. No.: 560,809
[22] Filed: Jul. 31, 1990
[51] Int. Cl.⁵ .............................. B65G 47/34
[52] U.S. Cl. .................... 198/372; 198/370; 198/362; 198/367
[58] Field of Search .............. 198/361, 362, 367, 370, 198/372, 597, 598, 436, 358, 366

[56] References Cited

U.S. PATENT DOCUMENTS

| | | | |
|---|---|---|---|
| 3,036,691 | 5/1962 | Byrnes | 198/367 X |
| 3,058,565 | 10/1962 | Byrnes | 198/367 X |
| 3,138,238 | 6/1964 | Good et al. | 198/362 |
| 3,983,988 | 10/1976 | Maxted et al. | 198/367 X |
| 4,328,889 | 5/1982 | Maxted | 198/367 |
| 4,372,435 | 2/1983 | Bradbury | 198/372 X |
| 4,598,815 | 7/1986 | Adama | 198/372 |
| 4,703,844 | 11/1987 | Jahns | 198/367 |
| 4,746,003 | 5/1988 | Yu et al. | 198/367 |
| 4,792,034 | 12/1988 | Leemkuil | 198/372 |

Primary Examiner—Robert P. Olszewski
Assistant Examiner—James R. Bidwell
Attorney, Agent, or Firm—King & Schickli

[57] ABSTRACT

A diverter assembly for a conveyor system includes a carriage mounting a plurality of positively driven shafts. The shafts each support a plurality of wheels that engage articles traveling on the conveyor system. The wheels swivel between an aligned straight-through orientation and a skewed divert orientation. The swiveling motion is controlled by air cylinders associated with each shaft; the air cylinders being individually and selectively actuated. The carriage also has an associated air cylinder that elevates the carriage and the associated wheels to a raised position during the divert mode. The elevating mechanism and the swiveling mechanism are independently controlled and actuated. This arrangement provides a diverter assembly in which the diverter wheels are selectively raised and swiveled to positively and efficiently divert articles from the main line conveyor to a takeaway conveyor.

15 Claims, 3 Drawing Sheets

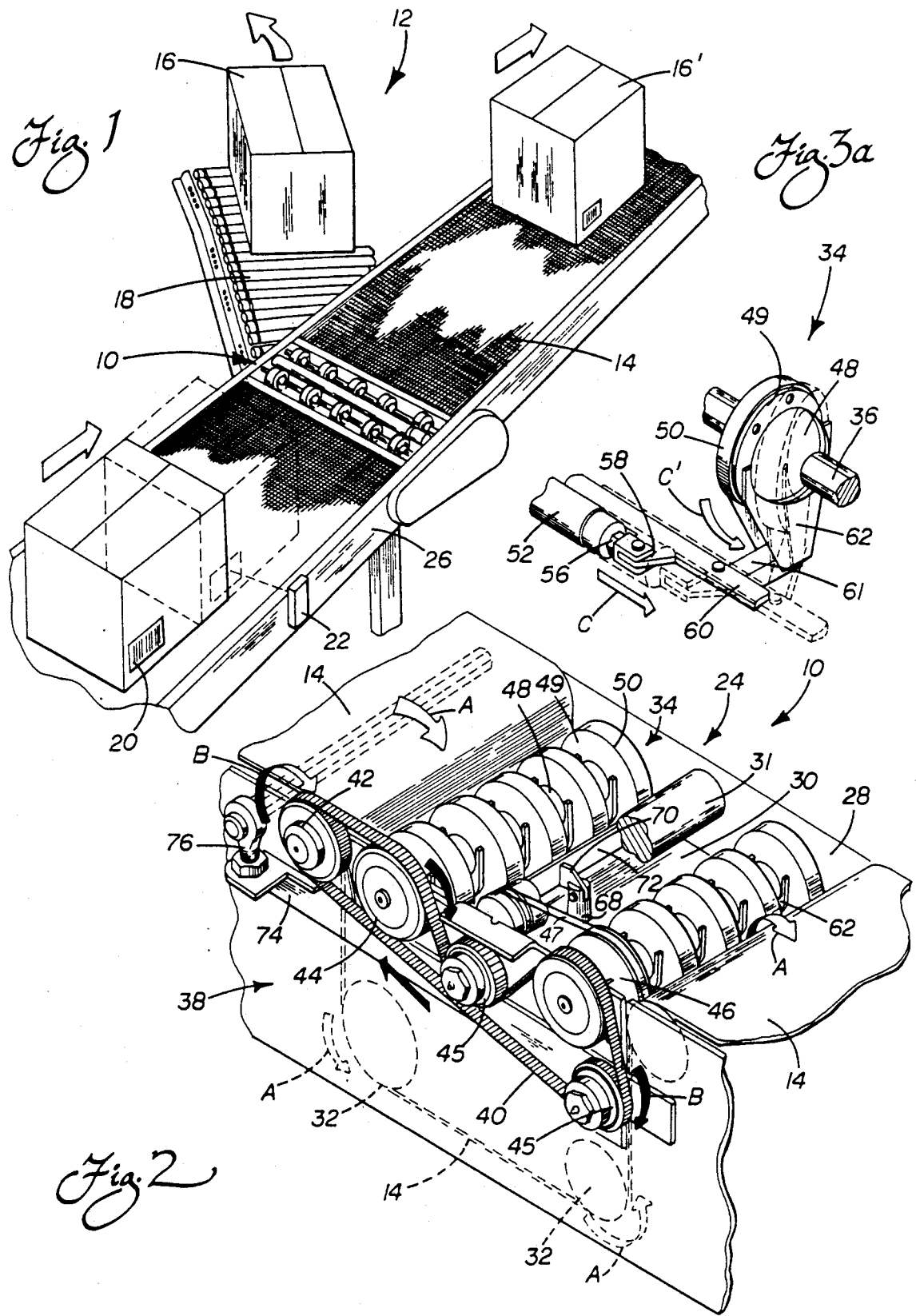

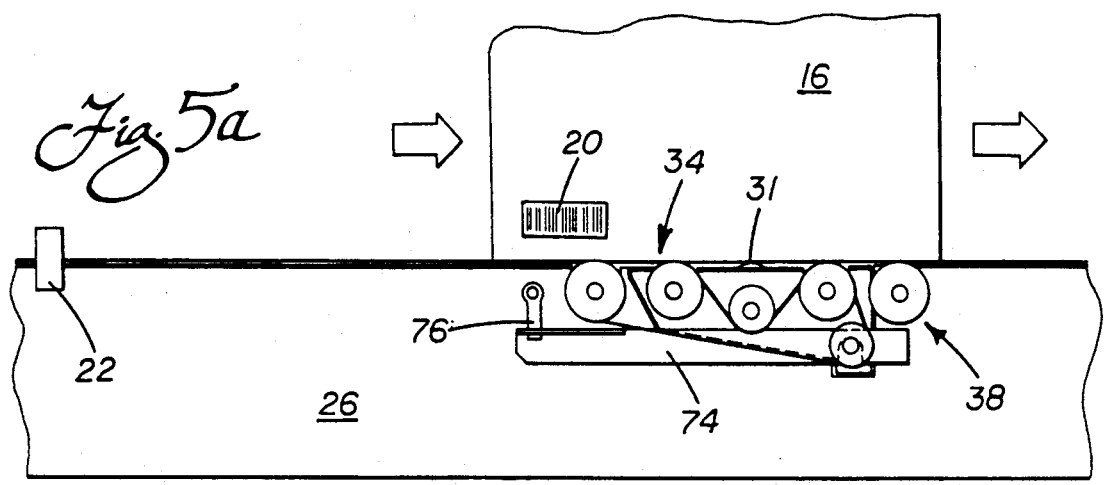
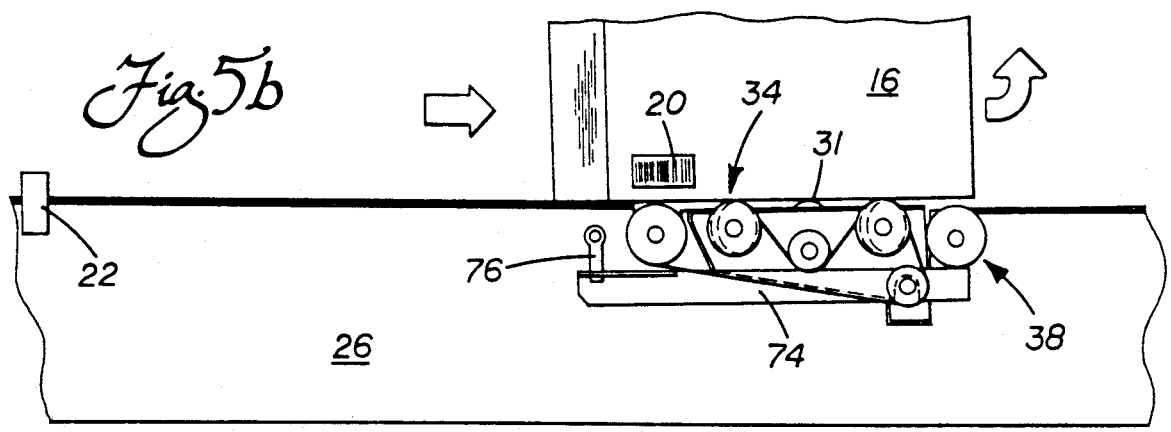
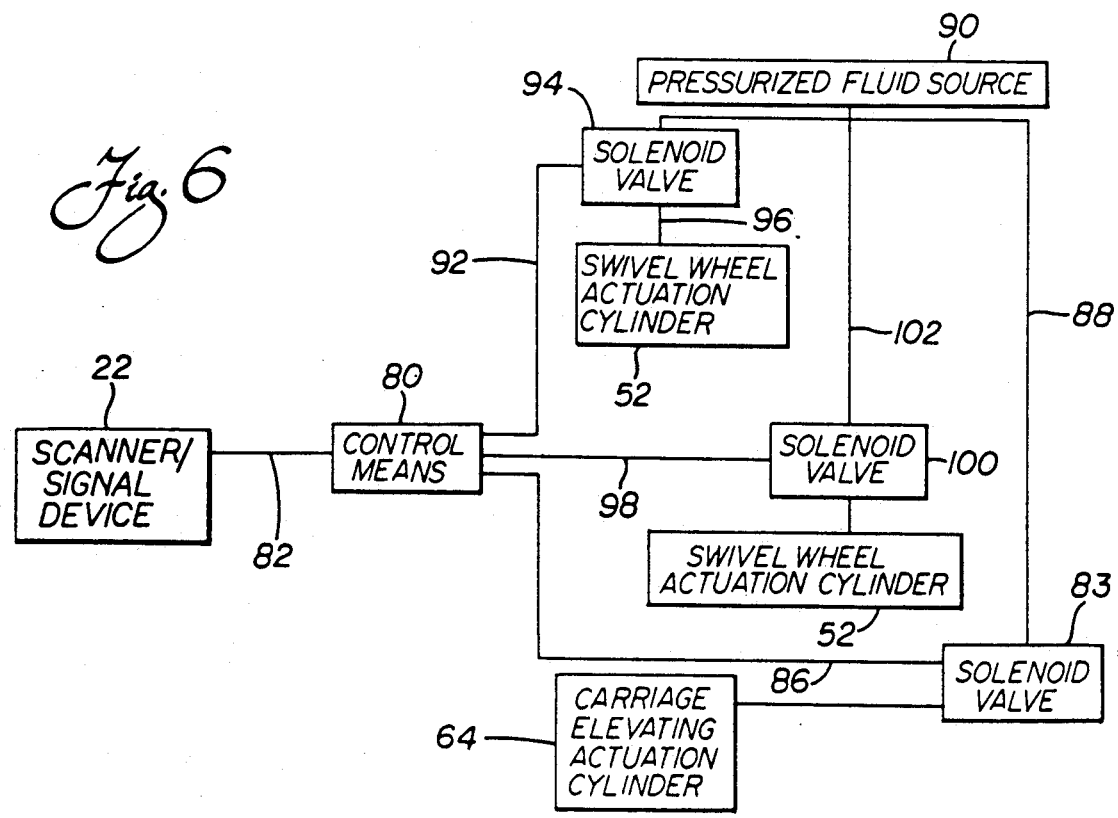

SWING-UP SWIVEL WHEEL DIVERTER ASSEMBLY AND METHOD

TECHNICAL FIELD

The present invention relates generally to conveyor systems, and more particularly to a diverter assembly and method that redirects and transfers cartons or the like from a primary conveyor to a secondary or takeaway conveyor.

BACKGROUND OF THE INVENTION

Most manufacturing facilities rely upon conveyor systems to transport articles through the facility. Finished products are normally loaded into cartons of appropriate size and transported to a storage area for later processing, or moved directly to the docking area for immediate transport. It can be appreciated that different products are normally stored in different sections of the storage area for ease of retrieval, and/or need to be transported to different sections of the docking area depending on the particular delivery site destination.

Accordingly, many industrial conveyor systems include sortation lines in which articles are carried along on a primary or main line endless belt conveyor and are diverted to secondary or takeaway conveyors depending on the desired destination within the facility. Various diverter assemblies have been used in the past to accomplish this task.

Early devices included piston-actuated pushers that deflect an article to a takeaway conveyor oriented at approximately 90° from the main line conveyor. In order to ensure that the next succeeding article on the main line conveyor is not hindered by the pusher and/or there is no interference with the diverted article, the minimum required gap between articles for this type of diverter design is relatively large. Alternatively, the main line conveyor is operated in stepped fashion, stopping briefly to allow the article transfer to take place. In both instances, overall operation is relatively slow, inefficient and costly.

In order to improve efficiency, diverter assemblies have been developed incorporating wheels that are angularly skewed from the longitudinal orientation of the main line conveyor. This allows the diverted article to be positively and quickly carried in a lateral direction off the main line conveyor towards a takeaway conveyor. One of the most successful of these prior art diverter concepts involves a diverter assembly including a plurality of wheel assemblies, each assembly having a wheel coupled to a central hub. The wheels swivel between an aligned, straight-through orientation relative to main line conveyor travel and a skewed, divert orientation, providing straight-through conveyance and diversion, respectively. The wheels are situated so as to extend slightly above the level of the main line conveyor. The rows of wheels are actuated simultaneously by a controller. This diverter wheel assembly design is generally disclosed in U.S. Pat. No. 4,372,435 to Bradbury, assigned to the present assignee.

A further example of such an assembly is disclosed in U.S. Pat. No. 3,983,988 to Maxted et al. In one embodiment (similar to that of the assignee's as described above), the diverter assembly includes diverter wheels that are maintained at substantially the same elevational height (i.e. slightly above the level of the main line conveyor) and pivoted between an aligned, straight-through orientation when transporting to a position further downstream and a skewed position when diverting is desired. The system includes a plurality of rows of wheels, the wheels in the second and each succeeding row being skewed at a greater angle than the next preceding row.

The '988 patent discloses a second embodiment wherein the diverter wheels in each of the plurality of rows are permanently maintained in a skewed position, again with the second and succeeding rows being skewed at a greater angle. The wheels are positioned inoperatively below the level of the main line conveyor to allow straight-through, downstream conveyance. The wheels of the assembly are raised above the level of the main line conveyor to provide the diverting function.

Each of these operative designs presents certain drawbacks. With the latter, pop-up design having permanently skewed wheels, it can be appreciated that the wheels in the non-diverting position must be below the level of the main line conveyor. Accordingly, positive contact with the conveyed article is interrupted or lessened to a degree as it passes over the diverter assembly. In certain situations, this can disrupt the constant speed of the conveyed articles along the main line conveyor, progressively altering the gap distance between successive articles. With the former, pivotable wheel design having a constant elevation above the main line conveyor, it can be appreciated that when the article contacts the wheels in the aligned orientation relative to straight-through conveyor travel, the article has a tendency to bounce or bobble as it passes over the diverter assembly. This also disrupts consistent advance resulting in progressively changing gap distance between successive articles.

Thus, it is necessary to correct the tendency of each of the previously discussed prior art diverter assembly designs that tends to randomly alter the gap distance between successive articles. This prior tendency adversely effects the efficient operation of the main line conveyor since the spacing between articles becomes erratic, making it more difficult to control the article handling equipment at the end of the line.

In an effort to avoid these drawbacks, recent developments in diverter assemblies have incorporated a combination of the wheel pivoting and elevating action. More particularly, the diverter assembly is designed so that the pivoting of the diverter wheels is directly integrated with the elevating of the wheels above the main line conveyor. An example of such a diverter assembly is disclosed in U.S. Pat. No. 4,598,815 to Adama. The Adama diverter assembly includes diverter wheels that generally are level with the main line conveyor belt and rest in an aligned, straight-through orientation. When diversion of an article is desired, the diverter wheels are simultaneously raised and pivoted within the diverter assembly. The diverter wheels thus engage the articles and lift them slightly, both removing part of the forward momentum and positively redirecting the orientation of the articles toward the side. The diverter wheels in effect turn the articles toward the takeaway conveyor.

The Adama diverter assembly has other drawbacks. More particularly, the lift mechanism and pivot mechanism are integrated. This integration decreases the ability to precisely control the individual pivoting and elevating functions. The integration of the functions also increases the opportunity for operational breakdown of the entire assembly. Additionally, integration of the pivot and lift mechanisms reduces the flexibility for adjustment to optimize the divert operation, for example, for particular size articles, particular weight articles and boxes or cartons of different materials.

A need therefore exists for a diverter assembly that provides independent pivoting and elevating of diverter wheels to allow maximum efficiency, flexibility and control of the divert operation. Such an assembly should provide positive, level contact for non-diverted articles to efficiently maintain article straight-through conveyance, and smooth operation through the entire processing stream. It is now proposed that maintenance of a constant and minimum gap distance between successive articles is necessary to allow the main line conveyor to be operated at a more controlled speed, while still maintaining maximum conveying efficiency. Of course, the generally slower, controlled speed operation of a conveyor system provides gentler article handling and requires less energy, and hence is more efficient. With the reduced gap between articles, the same or even increased through-put of the system can be obtained.

SUMMARY OF THE INVENTION

Accordingly, it is a primary object of the present invention to provide a diverter assembly that overcomes the above-described limitations and disadvantages of the prior art and achieves the improved control and related advantages.

It is another object of the present invention to provide a diverter assembly that allows consistent and controlled straight-through conveyance regardless of the size and/or weight of the conveyed article.

Still another object of the present invention is to provide a diverter assembly that provides positive contact with conveyed articles in both the straight-through mode and divert mode at all times to assist in consistent operational efficiency.

Another object of the present invention is to provide a diverter assembly that eliminates the bounce or bobble associated with contact by the conveyed articles by positioning the diverter wheels level with the conveyor system when in the straight-through aligned mode, and raised only in the diverting mode.

It is an additional object of the present invention to provide a diverter assembly that maintains constant and minimum gap between successive articles to enhance the operational efficiency by sequenced operation of the wheels in successive stages, and operation of the entire assembly at a more controlled speed.

Still another object of the present invention is to provide a diverter assembly with a plurality of rows of diverter wheels, each row of wheels being of successively greater height to provide controlled ramping action and selectively swiveled to assist in controlled article movement and reducing the minimum required article gap.

It is a further object of the present invention to provide a diverter assembly that has an elevating mechanism that allows the diverter wheels to be lifted above the level of the conveyor only in the divert mode; the elevating mechanism being separate and independently actuable from the swiveling mechanism of the diverter wheels.

Another object of the present invention is to provide a diverter assembly whose diverter wheels are positively driven by live shafts through the motion of the main line conveyor in both the straight-through and divert modes, and whose wheels are operated by rows in sequence as the article is engaged.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an improved diverter assembly for diverting articles from a main line conveyor to a takeaway conveyor is provided. It can be appreciated that there may be one or more diverter assemblies placed at strategic positions along the conveyor system to divert articles at desired locations.

The diverter assembly includes a carriage that is placed within the conveyor frame. The carriage supports one or more shafts, each shaft receiving a plurality of diverter wheel assemblies to form transverse rows. Each wheel assembly includes a wheel coupled to a hub. It is noted here that reference to the diverter wheel of the present invention means the wheel portion of the assembly that operatively raises and swivels to engage and divert the conveyed articles or cartons.

The diverter wheels are adapted to swivel between a straight-through aligned orientation with respect to main line conveyor travel in one mode of operation (straight-through conveyance) and a skewed orientation in a second mode of operation (diversion or transfer). When in the divert mode of operation, the wheels associated with each shaft swivel independently of the wheels associated with each of the other shafts. More specifically, the first row of wheels swivel in sequence just prior to the next succeeding row of wheels relative to the direction of travel of the conveyor system. When the diverted article or carton passes the first row of diverter wheels, they immediately swivel back to the aligned straight-through orientation in readiness to receive the next article. Each succeeding row of wheels immediately follows in like manner. The specific timing and individual actuation of the rows or diverter wheels substantially increases operational efficiency by allowing the conveyor system to operate with a minimum gap between cartons.

The diverter wheel assemblies are specifically designed to conform to the general disclosure embodied in U.S. Pat. No. 4,372,435 to Bradbury, and now assigned to the assignee of the present invention. More specifically, a hub with a spherical outer surface is attached to the wheel shaft. A wheel with a spherically curved inner surface is coupled to the hub. The coupling permits the axis of the wheel to be moved relative to the axis of the hub in any direction while restraining relative motion between the wheel and hub about the axis of the hub. Thus, the hub is driven by the shaft passing through its axis, which in turn drives the wheel regardless of the angle between the hub and the wheel. Accordingly, the wheels are positively driven in like manner while in both the straight-through aligned mode and the skewed divert mode.

The diverter wheels are swiveled with the use of air cylinders controlled by solenoid valves. More specifically, one air cylinder is associated with each row of diverter wheels. The air cylinder is connected to a motion arm that is parallel to the shaft on which the diverter wheel assemblies are mounted. Each wheel is held between a pair of forked pivot brackets; all of the pivot brackets cooperating with the motion arm through individual connecting arms. Thus, when the air cylinder is actuated, the attached motion arm responds by moving in a parallel manner beside the wheel shaft. The pivot brackets swivel in response to the connecting arm motion and the diverter wheels are likewise swiveled within the supporting brackets while the hubs continue to rotate coaxially with the shaft.

In an effort to increase the efficiency and flexibility of the divert mode, the divert carriage is adapted to be elevated to ensure that the wheels, when skewed, positively and operationally contact the article. More specifically, an air cylinder controlled by a solenoid valve is provided that elevates the carriage, swinging it about a pivot axle attached to the conveyor frame. The air cylinder is attached to a bracket that is in turn attached to a cross rail extending across the carriage parallel with the wheel shafts. Thus, when the actuation cylinder is operated, the entire diverter carriage swings up about the pivot axle so the diverter wheels positively engage and retard the forward momentum of the article or carton, and by timed swivel action of the rows of wheels the diverting action is accomplished in a controlled manner.

The pivot axle is positioned in front of the diverter carriage or upstream relative to the direction of conveyor travel. Accordingly, upon elevation of the carriage, the first row of swivel wheels is raised slightly above the level of the conveyor system. Each succeeding row of diverter wheels is raised to a higher level so that the article is positively engaged and raised or ramped up as it travels across the diverter while in the divert mode. Once the diverted article passes to the secondary takeaway conveyor, the actuation cylinder is retracted and the carriage is lowered so that the wheels are maintained at the same level as the upper surface of the main line conveyor belt. This provides a smooth pathway for articles passing over the diverter assembly in the straight-through aligned mode. Accordingly, article bobble and the characteristic tendency of that bobble to randomly alter the distance between successive articles is avoided.

As mentioned above, the diverter wheels are positively driven in both the straight-through aligned mode and the divert mode. More particularly, a timing belt driven by a connector pulley that is attached to the main line conveyor is utilized to positively drive the shafts on which the diverter wheel assemblies are carried. Each of the shafts are attached to a separate drive pulley over which the timing belt runs.

In operation, as an article proceeds along the main line conveyor and approaches the diverter assembly, a bar code scanner and signal device reads a bar code or indicator label placed on the carton by an upstream operator. The bar code label is coded to identify whether the article proceeds through the diverter assembly to a position further downstream or is to be diverted to a takeaway conveyor for other processing or storage. As the article approaches the diverter assembly, the diverter wheels are in the straight-through aligned orientation and are positioned so that their outer periphery is at the same level as the conveyor belt. If the article is to proceed downstream, the diverter wheels remain in this position and thus the article is engaged by the positively driven wheels without bouncing or bobbling. There is no disruption of the predetermined gap between successive articles.

If the article is to be diverted, the scanner/signal device transmits this information to the diverter assembly control means. The control means actuates the carriage elevating actuation cylinder so that the diverter carriage swings up to position the diverter wheels above the level of the main line conveyor belt. Accordingly, the article is raised and gradually lifted as it passes over the diverter assembly. The control means actuates the first swivel wheel actuation cylinder so that the first row of diverter wheels swivels first to the skewed orientation for diversion. The control means then substantially immediately actuates the next succeeding swivel wheel actuation cylinder so that the wheels in the following row are sequentially positioned in the skewed orientation for completing the diversion.

Once the article passes over the first row of diverter wheels, the first swivel wheel actuation cylinder retracts so that the wheels on this row return to the straight-through aligned orientation. The same process successively occurs with each succeeding row of diverter wheels so that when an article passes the last row of diverter wheels it returns to the straight-through aligned position in sequence. A closely following article that is proceeding straight through is thus not inadvertently skewed.

The carriage elevating actuation cylinder then retracts to lower the diverter carriage to the home position to allow the next succeeding article to be handled according to the instructions provided on its bar code label. It can be appreciated, that when in the divert mode, the elevating action of the diverter carriage and the swiveling action of the diverter wheels are independently controlled and actuated. This increases the efficiency and flexibility of the divert operation over the prior art method of integrating the two activities in the divert mode. It further simplifies service and repair of the components associated with the diverter assembly.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification, illustrates several aspects of the present invention and together with the description serves to explain the principles of the invention. In the drawing:

FIG. 1 is a partial perspective view of a main line conveyor including the diverter assembly of the present invention;

FIG. 2 is a perspective view of the diverter assembly of the present invention partially broken away, showing particularly the drive mechanism of the diverter assembly and further showing the connection of the carriage to the elevating actuation cylinder;

FIG. 3A is a partial view in perspective of the wheel actuating linkage, also with the skewed divert orientation of the wheels shown in phantom;

FIG. 5A is a side elevational view of a conveyor system including the diverter assembly of the present invention, showing a carton passing over the diverter assembly in the straight-through aligned orientation;

FIG. 5B is a side elevational view of the conveyor system including the diverter assembly of the present invention, showing a carton passing over the diverter assembly in the skewed divert mode; and FIG. 6 is a schematic view of the control circuit associated with the swivel wheel actuation cylinders and carriage elevating actuation cylinder.

Figure 3:
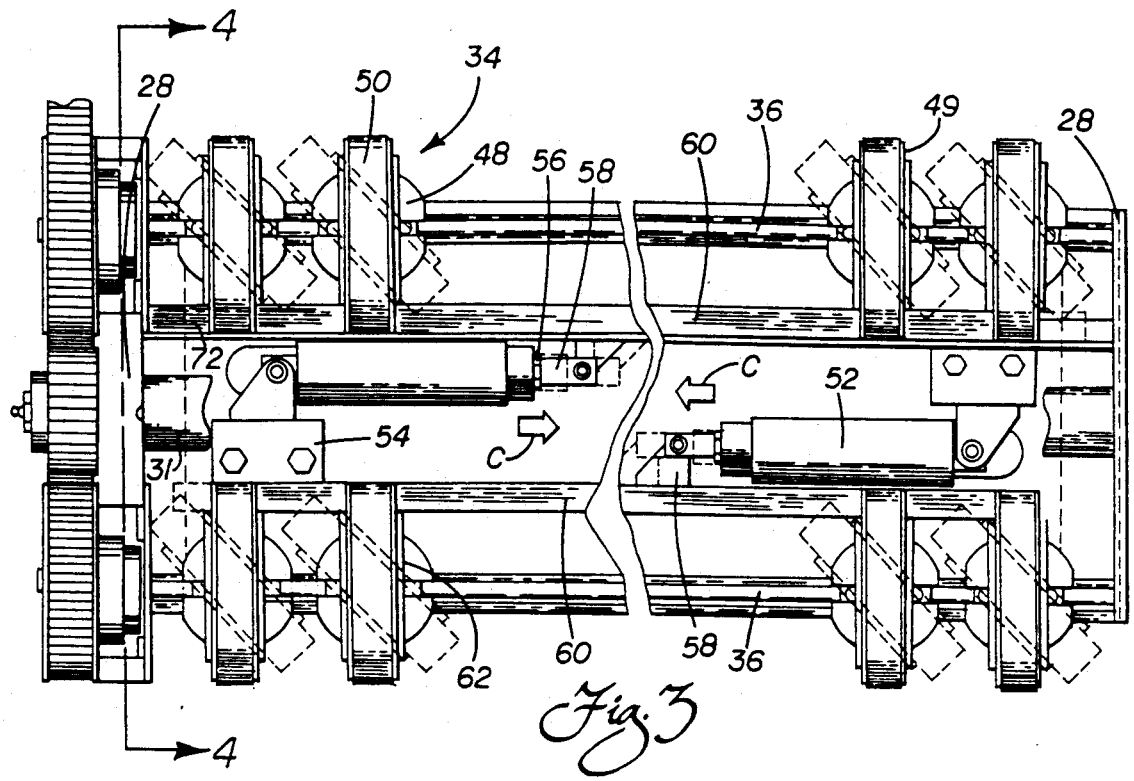
FIG. 3 is a partially broken away top view of a portion of the diverter assembly of the present invention showing the action of the swivel wheel actuation cylinders, with the skewed divert orientation of the wheels shown in phantom.

Reference will now be made in detail to the present preferred embodiment of the invention, an example of which is illustrated in the accompanying drawing.

DETAILED DESCRIPTION OF THE INVENTION

A swing-up swivel wheel diverter assembly 10 constructed in accordance with the teachings of the present invention is disclosed as cooperating with a conveyor system 12 including a main line conveyor 14. As will be appreciated from a review of the following description in conjunction with the drawings of the preferred embodiment, the diverter assembly 10 efficiently diverts the selected cartons 16 to the takeaway conveyor 18 while allowing non-selected cartons 16' to continue along the main line conveyor 14. One feature of the invention is to maintain the preselected gap between successive in-feed cartons. The diverter assembly 10 allows the preselected gap to be minimized to enable the conveyor system to be more easily controlled at a slower speed while still providing the desired carton feed and divert rate. The diverter assembly 10 further provides in accordance with the invention optimum operational flexibility by independently controlling the important actions of the assembly components.

As shown in FIG. 1, the diverter assembly 10 is strategically placed within the conveyor system 12 to properly direct the selected cartons 16 to the takeaway conveyor 18 when in the divert mode. It can be appreciated that any number of diverter assemblies 10 may be incorporated into a conveyor system 12 depending on the nature of facility operation and its specific carton destination requirements. An operator upstream determines the destination of each carton 16 that travels along the conveyor system 12. A bar code or indicator label 20 is placed on each carton 16 as it enters the conveyor system 12. As the cartons 16 approach each diverter assembly 10, a bar code scanner and a signal device 22 works in conjunction with the conveyor system 12 to read the bar code label 20 and precisely locates the head and tail end of the carton. The decision to divert is dictated by the information on the bar code label. If not so commanded, the carton 16 is allowed to advance for further processing downstream. When dictated to divert, the information from the scanner/signal device is sent to a controller. As will be seen more in detail below, the actuation cylinders of the diverter assembly are operated in proper sequence and for a proper time period depending on the length of each carton to be diverted.

Figure 4:
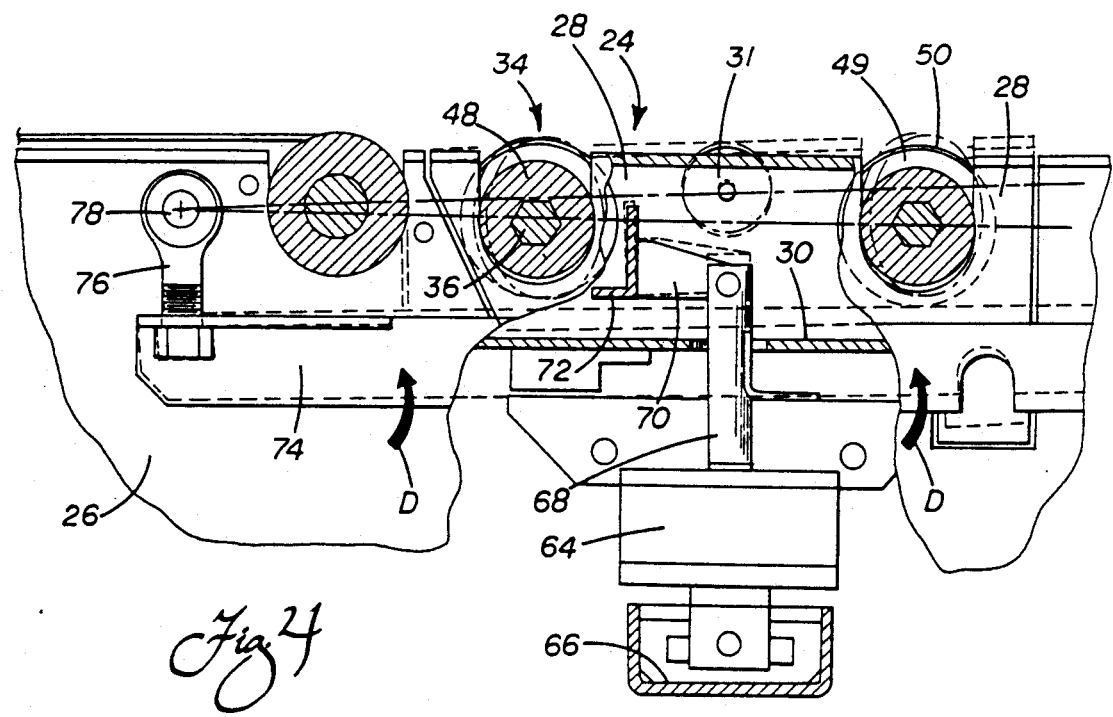
FIG. 4 is a partially broken away side elevational view of the diverter assembly of the present invention, taken along line 4—4, showing the operation of the carriage elevating actuation.

As best shown in FIGS. 2 and 4, the diverter assembly 10 includes a carriage 24 that cooperatively fits within the conveyor frame 26 of the conveyor system 12. The carriage 24 is defined by a pair of side frames 28 and a bottom platform 30 and supports the operative components of the diverter assembly 10. The carriage 24 receives one or more bridge rollers 31 in the center that provide a partial supporting transport surface for the cartons 16. The preferred embodiment incorporates one bridge roller 31. As can be appreciated from FIG. 2, the belt of the main line conveyor 14 travels around by-pass rollers 32, shown in phantom beneath the carriage 24. Thus, the belt passes beneath the diverter assembly 10 as it travels forwardly along the conveyor system 12 (see action arrows A).

As briefly indicated above, the diverter assembly has two operative modes: a straight-through mode for passing cartons 16' downstream and a divert mode for directing cartons 16 to the takeaway conveyor 18. In each of these modes, a plurality of diverter wheel assemblies 34 positively and efficiently engage the cartons 16 to provide the optimal carton delivery for the selected mode. The wheel assemblies 34 are positioned in one or more rows that extend laterally between the side frames 28 of the diverter carriage 24. The preferred embodiment of the invention contemplates the inclusion of two rows of diverter wheel assemblies 34. It can be appreciated that the number of rows may be increased to accommodate the diversion of cartons 16 of substantial length. The particular operation of the respective modes will be described in further detail below.

The diverter wheel assemblies 34 of the assembly 10 are positively driven. More particularly, the wheel assemblies 34 of each row are carried on a shaft 36 and continuously driven by a drive assembly 38 (see FIG. 2). The drive assembly 38 operates in association with the drive mechanism of the conveyor system 12. Thus the diverter wheel assemblies 34 are positively driven without the need of a separate and independent drive means or timing devices.

As shown in FIG. 2, a timing belt 40 engages a series of pulleys 42, 44, 45 driving the shafts 36 supporting the diverter wheel assemblies 34. More specifically, a connector pulley 42 is connected to a roller of the main line conveyor 14. Thus, the timing belt 40 is driven through the main line conveyor 14. Drive pulleys 44 are connected to the drive shafts 36 to transmit the driving motion generated by the timing belt 40. Idler pulleys 45 complete the drive assembly 38 and allow the timing belt 40 to properly operate during the complete drive cycle, as indicated by the action arrows B. The bridge roller 31 may also be driven by the drive assembly 38 if desired. This may be accomplished by replacing an end diverter wheel assembly 34 with a roller pulley 46 that drives the roller 31 through drive belt 47.

Turning attention now to the important diverting movement of the diverter assembly 10 as briefly described above, the swiveling action of the wheel assemblies 34 is best shown in FIGS. 3 and 3A. The design of the wheel assemblies 34 is particularly beneficial for accepting the positive drive provided by the drive assembly 38 in both the straight-through mode (as shown in full line) and in the skewed divert mode (as shown in phantom). Each wheel assembly 34 includes a drive hub 48 that positively engages with the associated drive shaft 36. Thus, the shaft 36 and hub 48 are maintained in coaxial and driving relationship at all times. The hub 48 has a spherically curved outer surface that is operatively coupled to a wheel 49 having a mating spherically curved inner surface. It is the wheel 49 that operatively swivels to assist in the diversion of the cartons 16. The coupling secures the wheel 49 to the drive hub 48 to permit the axis of the wheel 49 to be rotated relative to the axis of the hub 48 in any direction. Thus, when the hub 48 is driven by the drive shaft 36 passing through its axis, the wheel 49 is positively driven regardless of the angle between the hub 48 and wheel 49.

A tire 50 of rubber or urethane fits around the circumference of the wheel 49 and serves as the frictional engaging surface to drive the cartons 16. Reference is made to U.S. Pat. No. 4,372,435 to Bradbury, owned by the assignee of the present invention, for further details on the general design of the coupling and diverter wheel assembly 34.

The swiveling action of the diverter wheels 49 is generated through a solenoid controlled swivel wheel actuation cylinder 52 associated with each row of diverter wheel assemblies 34. While the preferred embodiment contemplates the use of air cylinders, it can be appreciated that another type of actuator may also be used with the invention. Each cylinder 52 is attached to the diverter carriage 24 by a mounting bracket 54. A cylinder rod 56 extends from the cylinder 52 and has a connecting bracket 58 at its distal end. The connecting bracket 58 is attached to a motion arm 60. The motion arm 60 is parallel and adjacent to the shaft 36 that holds the diverter wheels 49 being controlled.

A forked pivot bracket 62 including a pair of yokes (see also FIGS. 2 and 3A) is coupled to the motion arm 60 at a position adjacent each diverter wheel assembly 34. The coupling function is provided by a connecting arm 61 pivoted to the motion arm 60. The distal end of each arm 61 is fixedly attached to the base of the corresponding pivot bracket 62. Each yoke of the pivot bracket 62 extends upward around one side of the drive hub 48 and each bracket thus straddles the respective wheel 49 of each assembly 34. Thus, in operation, when the swivel wheel actuation cylinder 52 is actuated, the cylinder rod 56 extends, as shown by action arrows C in FIG. 3 and 3A, to shift the respective motion arm 60. The pivot bracket 62 responds by pivoting about a pivot bolt (not shown) mounted on the platform 30 of the assembly 34 (not shown in FIG. 3A). The swivel action of the connected wheel 49 is shown by action arrow C' in FIG. 3A.

The wheel assemblies 34 are generally designed so that the wheels 49 swivel to a maximum angle of about 37°. However, the diverter assembly 10 can be adapted to have a greater or lesser swivel angle depending on the diversion requirements. The preferred embodiment of the diverter assembly 10 also provides for all of the wheels 49 to be swiveled to the same angle.

In a further important aspect of the invention, the divert mode is initiated by the elevation of the carriage 24. This action is generated by a carriage elevating actuation cylinder 64. The cylinder 64 is anchored by a cross member beneath the bottom platform 30 of the diverter carriage 24 (see FIG. 4). As with the swivel wheel actuation cylinders 52, the carriage elevating actuation cylinder 64 is contemplated as being an air cylinder in the preferred embodiment.

The elevating actuation cylinder 64 includes a cylinder rod 68 that extends through the bottom platform 30, as shown in FIGS. 2 and 4. A mounting ear connects the cylinder rod 68 with a cross rail 72 attached (as by welding) to the side frames 28 of the diverter carriage 24. Swing arms 74 (only one shown) support the side frames 28 so that the diverter carriage 24 moves in an arc when the actuation cylinder 64 is operated. The pivot bars 76 on axle (or stub shafts) 78 carry the swing arms 74; the axle 78 defining the pivot axis about which the diverter carriage 24 swings when the elevating actuation cylinder 64 generates motion (see action arrows D in FIG. 4). Accordingly, it can be appreciated that the row of diverter wheel assemblies 34 at the greatest distance away from the pivot axle 78 (downstream) are elevated to a greater height than each succeeding row of wheel assemblies 34. Conversely, the row of assemblies 34 closest to the pivot axle 78 (upstream) are elevated to the lowest height. This allows the diverted carton 16 to be progressively raised or ramped up to ensure more gradual and positive engagement. The diverting action reduces the carton's forward momentum for better control as it passes over the diverter assembly 10.

It is important to note, as best shown in FIG. 5A, that when the diverter wheels 49 are aligned relative to the main line conveyor 14 in the straight-through mode for transport downstream, the outer periphery of the wheels 49 are at the same elevation as the main line conveyor belt 14. This allows the carton 16 to be positively engaged during the straight-through mode while substantially eliminating any bobble. In other words, the wheels no longer would extend slightly above the level of the conveyor belt 14, as is common with prior art diverter assemblies. This is extremely critical to conveyor system efficiency by allowing a minimum gap between cartons to be selected and maintained throughout operation of the conveyor system 12. As described earlier and as best shown in FIG. 5B, the diverter carriage 24 is elevated during the divert mode so as to allow the carton 16 to be positively engaged and progressively raised during diversion to effectively ensure the carton 16 is efficiently and reliably directed to the takeaway conveyor 18.

According to another important aspect of the invention, the swiveling motion and the elevating motion of the diverter assembly 10 in the divert mode, while coordinated for efficiency, are separately and independently actuated. As schematically shown in FIG. 6, the control means 80, such as an Allen Bradley PLC 5 programmable controller, receives a signal from the scanner/signal device 22 in response to its reading of the bar code label 20. The actuation cylinders 52, 64 respond independently to generate the appropriate action for the desired mode. Accordingly, there is no direct integration between the swiveling movement and the elevating movement, but rather the control means 80 is designed to effectively coordinate through appropriate timing the independent movement of the actuation cylinders 52, 64. The independent control of the swiveling and elevating mechanisms aids in system flexibility by facilitating incremental timing adjustments to create the optimum carton divert rate depending on, for example, the size, shape and weight of a carton.

The operation of a conveyor system 12 equipped with the diverter assembly 10 of the present invention will now be summarized. As a carton 16 advances along the main line conveyor 14 past the bar code scanner/signal device 22, a label 20 is scanned and the carton location noted. This label indicates whether the carton is to be diverted or passed downstream.

The scanned information is fed from the scanner/signal device 22 along line 82 to the control means or controller 80. When the carton 16 is to be passed on downstream on the main line conveyor 14, no signal is directed from the control means 80 to the two swivel wheel actuation cylinders 52 and the carriage elevating actuation cylinder which control the operation of the diverter assembly 10. Thus, the diverter assembly 10 remains in the home position shown in FIGS. 1 and 5A with the wheels 49 aligned and level with the upper surface of the belt. In this way, the carton 16' is smoothly directed downstream along the main line conveyor 14 with spacing between the cartons remaining unaltered.

Conversely, when the scanned information fed to the control means 80 indicates that the carton 16 is to be diverted, the control means 80 sends a signal along line 86 to activate the solenoid valve 83 opening fluid line 88 between pressurized fluid source 90 and the carriage elevating actuation cylinder 64. This causes the carriage 24 to swing upwardly to intercept the next carton 16. As the carton 16 approaches the first or upstream row of diverter wheels 49, the control means 80 sends a signal along line 92 to activate solenoid valve 94 opening fluid line 96 between the pressurized fluid source 90 and the actuation cylinder 52 to independently swivel the wheels 49 (as best shown in phantom lines in FIGS. 3 and 3A). The exact timing of the activation operation may be determined since both the speed of the main line conveyor 14 and the distance between the scanner/signal device 22 and the diverter assembly 10 is known and under computerized control of the control means 80.

Immediately following the activation of the upstream row of diverter wheels 49, is the activation of the downstream row. The delay between actuation of the two rows of diverter wheels 49 may be determined by any number of known handling parameters including, for example, the distance between the rows, the speed of the main line conveyor 14, as well as the size, and particularly the length, and the weight and other physical characteristics of the carton 16 being diverted. These parameters are taken into account in the programming of the control means 80 which serves to send another control signal at precisely the proper time along the line 98 to solenoid valve 100 that controls the swivel wheel actuation cylinder 52 of the second or downstream row of diverter wheels 49. When the solenoid valve 100 is activated, fluid line 102 is opened between the pressurized fluid source 90 and the cylinder 52. This causes the second row of swivel wheels 49 to swivel to the diverting position.

Together, (1) the lifting of the carriage 24 so that the wheels extend above the main line conveyor 14 and (2) the swiveling of the diverter wheels 49 in sequence or stages serve to smoothly and efficiently redirect the carton 16 to be diverted from the main line conveyor 14 to the takeaway conveyor 18, as shown in FIG. 1. Immediately following the diversion of the carton 16, the solenoid valves are again activated in stages by the control means 80. It is important to note that as soon as the trailing edge of the carton 16 clears the first row of diverter wheels 49, the first valve 94 is activated to return the wheels immediately to the straight-through mode. Thus, with a minimum gap between cartons 16, an inadvertent diversion of a closely following carton is prevented. This is especially advantageous where there are several rows of wheels 49 spanning a substantial distance along the main line conveyor 14; each row being redirected in stages as the carton 16 clears. Finally, the pressure is released from the cylinder 64, and consequently the return of the diverter assembly 10 to the home position, shown in FIGS. 1 and 5A, is effected. The diverter assembly 10 remains in this position until the scanner/signal device 22 detects another carton 16 to be diverted.

In summary, numerous benefits result from employing the concepts of the present invention. The outer periphery of the diverter wheels 49 are positioned at the same height as the main line conveyor 14 during the straight-through aligned mode to positively engage passing cartons 16' while substantially preventing any bounce or bobble. This allows a minimum gap between successive cartons 16 to be selected and maintained, thereby allowing the system to be better controlled and thus economically operated at maximum efficiency. In the divert mode, the diverter carriage 24 is elevated and the rows of diverter wheels 49 are swiveled in stages to allow the wheels 49 to positively engage and progressively raise the carton 16 to be diverted. This reduces the forward momentum of the carton 16 to enhance the efficiency of diversion as it is directed to the takeaway conveyor 18. The swivel wheel actuation cylinders 52 and the carriage elevating actuation cylinder 64 are independently operated and controlled, providing operation flexibility in fine-tuning the system to optimize the system carton divert operation.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with breadth to which they are fairly, legally and equitably entitled.

I claim:

1. A diverter assembly for articles on a conveyor system, comprising:
   a carriage;
   a plurality of shafts mounted in said carriage;
   a plurality of wheels on each of said shafts;
   means to selectively elevate said carriage; and
   means to selectively swivel said wheels on said shafts between straight-through orientation with respect to said conveyor system and a skewed orientation with respect to said conveyor system,
   said elevating and swiveling means being independent of each other and separately actuable, whereby said wheels are positioned in a divert mode in stages to provide positive, efficient diversion of the conveyed articles.

2. The diverter assembly of claim 1, further including means to positively drive said shafts carrying said wheels.

3. The diverter assembly of claim 2, wherein said drive means is cooperatively connected to a drive system of said conveyor system.

4. The diverter assembly of claim 3, wherein said drive means includes a timing belt operating a drive pulley attached to each of said shafts, said timing belt being itself driven by a pulley attached to a roller of said drive system of said conveyor system.

5. The diverter assembly of claim 2, wherein said wheels are elevationally positioned so that their top outer periphery is at a level substantially equal to said conveyor system while in said aligned straight-through orientation.

6. The diverter assembly of claim 5, wherein said carriage is pivotally mounted to said conveyor system to swing upwardly to the divert mode and said wheels on each one of the downstream shafts is raised to a greater height than said wheels on said next preceding upstream shaft relative to direction of travel of said conveyor system when in said divert mode.

7. The diverter assembly of claim 6, wherein all of said wheels are swiveled to the same angle when in said skewed orientation of the divert mode.

8. The diverter assembly of claim 7, wherein said swiveling means includes pressurized fluid means associated with each of said shafts, said pressurized fluid means being independently actuable to provide swiveling motion of said wheels in stages.

9. The diverter assembly of claim 8, wherein said pressurized fluid means are air cylinders.

10. The diverter assembly of claim 8, wherein said elevating means includes pressurized fluid means associated with said carriage.

11. The diverter assembly of claim 10, wherein said pressurized fluid means is an air cylinder.

12. A method of transferring cartons or the like from a main line conveyor including a diverter assembly having a carriage supporting a plurality of rows of diverter wheels to a takeaway conveyor, comprising the steps of:

feeding a carton to said diverter assembly;

independently elevating said carriage to place said diverter wheels above the level of said primary conveyor; and independently swiveling said diverter wheels from a straight-through orientation relative to said primary conveyor to a skewed orientation for diversion, whereby said carton is positively engaged and raised by said diverter wheels to retard the forward momentum of said carton and to divert it to said takeaway conveyor.

13. The method of claim 12, including the step of swiveling each successive row of diverter wheels in stages as said carton approaches and clears each successive row.

14. The method of claim 13, further including the steps of:

reading an indicator label on said carton; and providing control instructions to said diverter assembly prior to carton engagement to have said diverter assembly operate in either a divert mode to direct said carton to said takeaway conveyor or in a straight-through mode to pass said carton downstream.

15. The method of claim 14, further including the steps of:

swiveling each successive row of said diverter wheels from said skewed orientation to said straight-through orientation in stages as the carton clears the row; and independently lowering said carriage to a rest position after said carton is diverted, whereby said diverter assembly is prepared to engage the next succeeding carton on said primary conveyor.

* * * * *